Nov. 17, 1970 R. CARVELL, JR 3,540,908
PHOSPHORS FOR COLOR DISPLAY SYSTEMS
Filed Nov. 2, 1967 2 Sheets-Sheet 1

3,540,908
PHOSPHORS FOR COLOR DISPLAY SYSTEMS
Robert Carvell, Jr., Dallas, Tex., assignor to Texas Instruments Incorporated, Dallas, Tex., a corporation of Delaware
Filed Nov. 2, 1967, Ser. No. 680,243
Int. Cl. H01s *31/20*
U.S. Cl. 117—33.5            3 Claims

ABSTRACT OF THE DISCLOSURE

Phosphor particles are treated in a molten salt bath at elevated temperatures on the order of at least 400° C. to render the surface portion of the particles nonluminescent through alteration of the properties thereof. The molten salt employed is itself compatible with the phosphor particles but contains small amounts of impurities such as magnesium which will form an electron retarding surface barrier on the particles. After cooling of the mixture of the phosphor particles and salt, the salt in the mixture is dissolved in a solvent in which the phosphor particles are substantially insoluble to produce phosphor particles having a surface barrier layer. A viewing screen utilizing these phosphors is also described.

---

Figure 1:
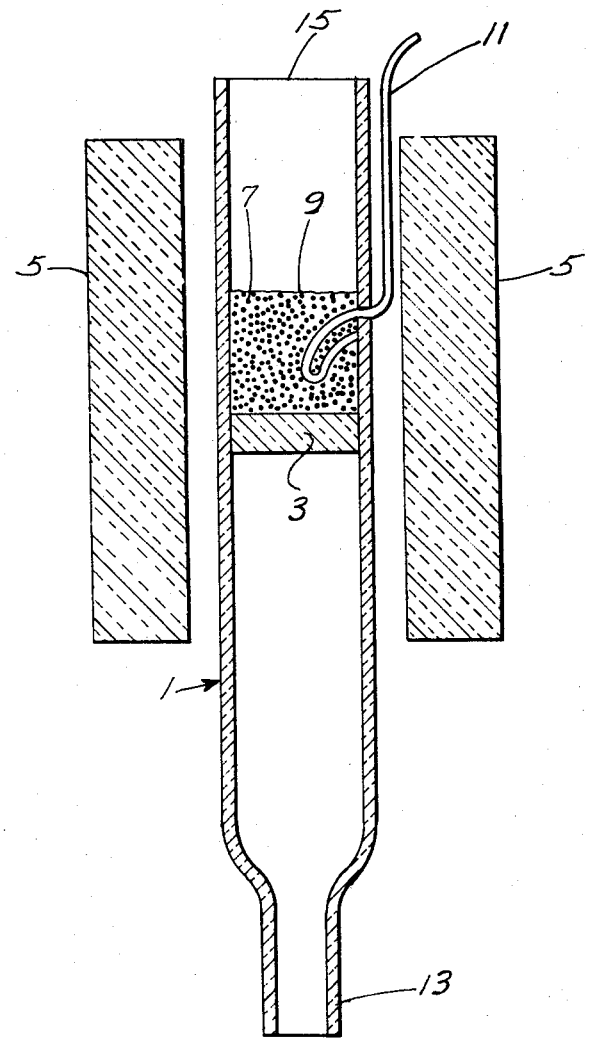

This invention relates to phosphors for color display systems, and more particularly to methods for making phosphors which have increased electron energization thresholds and viewing screens utilizing such phosphors.

Briefly, this invention is directed to a method of increasing the electron energization threshold of phosphor particles by treating the particles at an elevated temperature in a bath of a molten salt containing impurities which will form an electron retarding surface barrier on the particles. The salt employed is compatible with the phosphor particles so as to avoid complete or substantial inactivation of the particles. The resulting suspension of the phosphor particles in the molten salt is allowed to cool after the desired treatment time and the salt is then dissolved from the cooled mixture with a solvent in which the treated phosphor particles are substantially insoluble to produce phosphor particles having a surface barrier layer. The invention also includes viewing screens for color display systems which include particles of a first phosphor which emit light of a first color when excited by a beam of electrons having a velocity of at least a first predetermined value, and particles of a second phosphor having a surface layer which constitutes a partial barrier to electrons whereby the second phosphor particles have a higher electron energization threshold than that of said first phosphor particles, said barrier layer being formed on the surface of the particles by treatment of the phosphor particles at an elevated temperature in a bath of a molten salt containing impurities, the salt being compatible with the phosphor particles so as to avoid substantial inactivation of said particles. These second phosphor particles therefore emit light of a second color when excited by a beam of electrons having a velocity of a second predetermined value which is greater than said first value.

In recently developed color display systems, electron viewing screens are employed which include phosphor particles of different color-emitting characteristics and which respectively respond differently to electrons of differing energies or velocities. In such systems, the viewing screen includes a first phosphor (e.g., one which emits light of relatively long wavelengths such as red) which is energized to emit light when struck by electrons having at least a first predetermined velocity or beam energy level, for example, accelerated by a kinescope accelerating voltage of perhaps 10 kv., this being the operating voltage for the red phosphor, although the phosphor turns on or begins to emit light at much lower voltages. The viewing screen also includes particles of a second phosphor, e.g., one which emits a substantial level of a second color light of shorter wavelengths, and preferably complementary in color to that of the first phosphor (such as a cyan colored light), when energized by electrons having at least a second and higher predetermined velocity, e.g., 15 kv., this being the operating voltage for the second phosphor. That is, while the second phosphor begins to emit light at a lower voltage, perhaps at 10 kv., a substantially higher voltage is used to achieve the required light level. If a beam of electrons of the lower velocity, 10 kv., is current modulated in accordance with the red record represented by the red color information signal derived in the receiver of any conventional color television receiver (such as those operating in accordance with the NTSC, SECAM or PAL systems), a red color image corresponding to the red records is presented on the viewing screen of the kinescope. At electron velocities of 10 kv., the second or cyan light-emitting phosphor will not be significantly energized to emit light, although it may be just turning on. By current modulating a beam of electrons having a beam energy of 15 kv. with the green record represented by the receiver's green color information signal, both the first and second phosphors will be concurrently energized to produce a white or substantially achromatic light. Thus red and white images are produced on the viewing screen either continuously or alternately, by two electron beams moving in registry in a raster scanning pattern across the viewing screen. These images combine to form a composite image which subjectively appears to include a full range of hues including those which are not actually present in a colorimetric sense. Such a two-color system of presenting full color images is known in the art and provides images of pleasing appearance in which the hues appear more saturated than would be expected. Such a system is described in further detail in the coassigned application Ser. No. 452,299, filed Apr. 30, 1965 now Patent 3,371,-153.

To obtain an even more desirable color display, a viewing screen is employed which also includes particles of a third phosphor having a higher beam energy threshold, e.g., one which emits a substantial level of light of a third color (e.g., blue) when energized by electrons having a higher velocity, e.g., 20 kv. As above, the third phosphor may begin to turn on at a lower voltage, perhaps at 15 kv., but much higher voltages are needed for an operating light level. A beam of such an energy level, modulated in accordance with the blue record represented by the blue color information signal of the television receiver, will energize all three phosphors and produce a third image of coooler achromatic light, and provide a composite image of particularly pleasing color. A more detailed description of such systems may be found in the coassigned application Ser. No. 614,362, filed Feb. 6, 1967, now Pat. No. 3,372,229.

In coassigned application Ser. No. 459,582, filed May 28, 1965, now Pat. No. 3,408,223, the methods more particularly describe individually coating the particles by physical deposition of a vapor phase material on the surfaces of the phosphor particles to provide an electron retarding barrier layer. In coassigned applications Ser. No. 561,815, filed June 30, 1966, now Pat. No. 3,449,148 and Ser. No. 606,190, filed Dec. 30, 1966, now abandoned, improved methods are disclosed for forming phosphors which are differently responsive to electrons of different energy levels or velocities, and thus are particularly useful in the above discussed color display systems. In accordance with the present invention, novel and improved methods are provided for forming phosphor particles having increased energization thresholds.

Among the several objects of the invention may be noted the provision of phosphors for use in making viewing screens for color display systems in which image colors are controlled by modulating or varying the energy level or velocity of an electron beam; the provision of simple, economical and reliable methods of making such phosphors; the provision of methods of the class described in which phosphor particles of different color light-emitting properties may be provided with closely controlled electron energization thresholds; the provision of such methods which permit control introduction of impurities into the surface portion of phosphor particles to form a barrier layer and thereby promote nonluminescence of such layer; and the provision of viewing screens for color display systems which include such phosphors. Other objects and features will be in part apparent and in part pointed out hereinafter.

Figure 3:
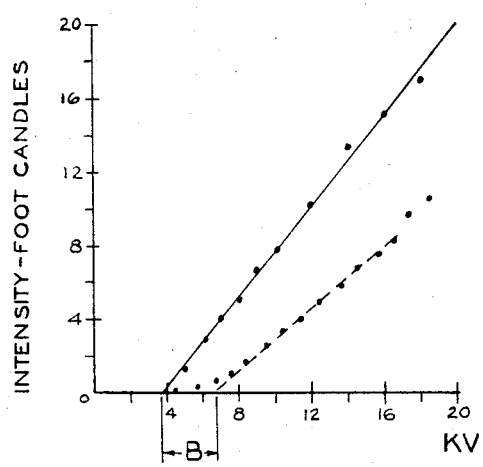
Figure 2:
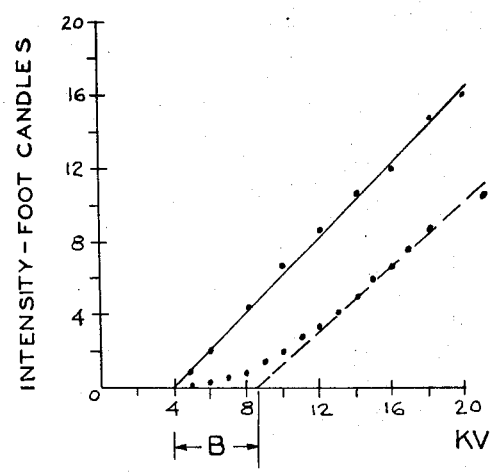
Figure 4:
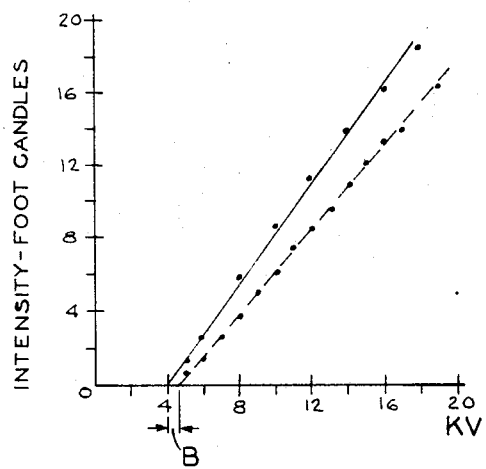
Figure 5:
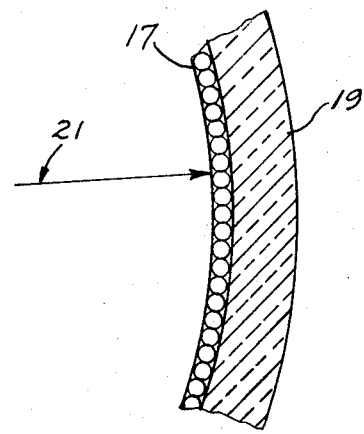

In the accompanying drawings, in which several of various possible embodiments of the invention are illustrated, FIG. 1 illustrates apparatus used in carrying out a method of the invention for forming phosphor particles with increased energization thresholds;

FIGS. 2–4 are graphical representations of the light output versus electron energization characteristics of phosphor particles prior and subsequent to formation of electron retarding surface barriers by methods of this invention; and FIG. 5 shows a portion of viewing screen of a color display system employing phosphor particles prepared by a method of the invention.

Corresponding reference characters indicate corresponding parts throughout the several views of the drawings.

Referring to FIG. 1, a reactor tube or elongate chamber of a heat resistant material such as quartz is indicated by reference character 1. Tube 1 is provided with a gas-permeable fritted quartz plug 3 and is located in an insulated furnace or heater 5. A charge 7 of salt containing impurities known to form an electron retarding surface barrier on phosphor particles is placed in tube 1 above plug 3 and heated to a molten state. A charge of phosphor particles 9 is then added to the molten salt and becomes suspended therein, the temperature of the suspension being sensed by thermocouple 11. An inert gas, such as nitrogen, is supplied to the tube 1 through inlet 13 and exits through outlet 15. By thus flowing a gas through the suspension of phosphor particles in the molten salt, agitation of the particles is effected which in turn permits substantially uniform formation of a surface barrier on the phosphor particles. The gas also permits a more even temperature distribution to be attained in the bath of molten salt-phosphor particles.

Particles of any of the conventional light-emitting phosphors may have their electron energization threshold increased by subjecting them to a method of the invention in the above-described apparatus. For example, five grams of a red light-emitting phosphor, cadmium sulfide (80%)-zinc sulfide (20%) (silver activated) such as that commercially available under the trade designation #1100 from Sylvania Electric Products, was added to thirty grams of molten zinc chloride in tube 1 and became suspended therein. The zinc chloride contained as impurities magnesium ($<$1000 p.p.m.) copper ($<$10 p.p.m.), manganese ($<$10 p.p.m.) and silicon ($<$1 p.p.m.) The size of the phosphor particles was about 12 to 20 microns. Nitrogen at the rate of 0.5 l./min. was continuously flowed through the tube 1, and a bath of the molten zinc chloride with the phosphor particles suspended therein. Prior to the addition of the phosphor particles, the zinc chloride had been heated to a temperature of 500° C. After adding the phosphor particles, the resultant mixture was heated at a temperature of 400° C. for one hour and then cooled. The phosphor particles were removed from the zinc chloride matrix by dissolving the zinc chloride in methanol.

Both an untreated sample and a treated sample of these phosphor particles were comparatively tested by conventional procedures and apparatus, such as described in the aforesaid co-assigned application Ser. No. 459,582. The light output (foot candles) versus the electron energization level of the untreated phosphor particles is graphically shown in FIG. 2 by the determinative points and the straight solid line approximation thereof which has a slope of 1.02. The determinative points and the straight broken line approximation thereof represent the light output versus electron energization level characteristic of the phosphor particles treated with the method of the present invention described above and this line has a slope of 0.88. The slope of the line representative of the treated phosphor particles therefore is 86% that of the untreated phosphor particles. Referring to FIG. 2, the solid line representation of the intensitiy electron energization level characteristic of the untreated phosphor particles intersects the axis of abscissas at 4.0 kv. and the broken line representation of this characterization of the treated phosphor particles intersects this axis at 8.6 kv. Thus, the phosphor particle surface layer formed as described above through a method of the present invention constitutes a barrier layer of 4.6 kv. as designated B.

As another specific example of the present invention, twenty-five grams of high purity zinc chloride was placed in tube 1 and heated to 500° C. in 100° C. increments, allowing ten minutes at each 100° C. increment, with nitrogen gas flowing through the zinc chloride throughout the heating procedure. The high purity zinc chloride was prepared by reacting high purity zinc (99.999+% zinc) with semiconductor grade hydrochloric acid and contained as impurities less than 1 p.p.m. of magnesium, less than 1 p.p.m. of copper and less than 5 p.p.m. of silicon. After heating to 500° C., the temperature of the molten zinc chloride was reduced to 400° C. and five grams of a red light-emitting phosphor, cadmium sulfide (80%)-zinc sulfide (20%) (silver activated) such as that commercially available under the trade designation #1100 from Sylvania Electric Products, was added to the molten zinc chloride and became suspended therein. The resulting mixture was heated at a temperature of 400° C. for one-half hour with nitrogen bubbling therethrough. After cooling, the phosphor particles were removed from the zinc chloride matrix by dissolving the zinc chloride in methanol. When tested according to the same procedure described above, these phosphor particles exhibited characteristics as shown in FIG. 3. That is, the barrier layer B was determined to be 2.7 kv. and the slopes of the untreated and treated phosphor particles were 1.24 and 0.82, respectively (thereby providing a slope ratio of approximately 66%). Thus, a higher barrier was produced using reagent grade zinc chloride than was produced using a high purity zinc chloride containing fewer impurities and in smaller concentrations.

In another specific example of the present invention, the first example was repeated except that the phosphor was a blue light-emitting phosphor, zinc sulfide (silver activated) such as that commercially available under the trade designation #1320 from Sylvania Electric Products.

The heating period was one hour. As illustrated in FIG. 4, the slope of the untreated phosphor was 1.38 and the slope of the treated phosphor was 1.16, thereby providing a slope ratio of approximately 84%. The barrier B was determined to be 0.8 kv.

It is thus seen that, in accordance with the present invention, a molten salt bath is employed as a vehicle or medium for carrying impurities from the salt to phosphor particles suspended in the molten salt bath, the impurities causing the formation of a barrier or nonluminescent layer over the outer or surface portion of each phosphor particle. While the precise mechanism underlying the invention is not fully understood, it is believed that the formation of the barrier layer, that is, the inactivation of the surface portion of the phosphor particles, is attributable to the impurities themselves or to alteration or change in the chemical composition and/or physical properties of the surface portion. In any event, as has been shown, a barrier layer is formed which has the effect of increasing the electron energization threshold of phosphor particles. Further, such phosphor particles with barrier layers corresponding to various energization thresholds may be produced by varying the concentration of impurities in the molten salt employed and the temperature and/or treatment period. In short, the present invention provides a practical method by which it is possible to control the introduction of impurities necessary to cause the desired degree of inactivation of the surface layer of phosphor particles.

While the foregoing examples show the use of zinc chloride as the salt for carrying the impurities which will form an electron retarding surface barrier on phosphor particles, it will be understood that any suitable salt compatible with the phosphor particles may be employed to give satisfactory results. Salts which are not compatible with phosphors and which are not therefore useful in the present invention are those known to the art as causing complete or substantial inactivation of phosphors. Thus, for example, copper and iron salts are recognized as being incompatible with phosphors inasmuch as the copper and iron ions substantially inactivate phosphors and render them nonuseful. Other zinc salts which may be used in lieu of zinc chloride include zinc fluoride, zinc bromide and zinc acetate, and various salts of other metals may likewise be employed.

The impurities which are carried by the molten salt and which will form an electron retarding surface barrier on phosphor particles may be those customarily found in small amounts in reagent grade metal salts, and include elements such as magnesium, manganese, copper, silver and the like. Where a reduced nonluminescent effect is desired, the concentration of impurities may be decreased through employment of higher purity salts. Conversely, the concentration of impurities may be increased to produce increased barrier layer thickness or a higher degree of inactivation of the surface layer of phosphor particles. Thus reagent grade metal salts may be used, or salts of high purity with closely controlled concentrations of selected imprities may be employed.

Preferably, as illustrated in the foregoing examples, the treatment of phosphor particles in accordance with the invention is carried out at an elevated temperture on the order of 400° C., but higher temperatures may be employed particularly where the melting point of the salt utilized requires such higher temperatures to maintain a molten condition.

The solvent used to separate the phosphor particles from the molten salt matrix after treatment has been conducted for the desired period of time may be any solvent in which the salt is soluble but in which the phosphor particles are substantially insoluble. Thus, depending upon the particular salt employed, the solvent may be water, methanol, acetone or other commonly available solvents which would be useful to effect separation of the phosphor particles from the salt.

It will be noted that the above methods effect a thorough agitation of the phosphor particles in a fluid medium which results in even temperature distribution relative to the phosphor particles and provides a barrier layer thereon which is even and consistent. Also, it is to be understood that a convenient means is provided by this invention for introducing impurities which will "kill" luminescence in the outer surface portion of the phosphor particles. The methods herein disclosed also insure convenient means for controlling the environment and atmosphere surrounding the particles during treatment by permitting the flow of the desired gas over and/or through the liquid phase-phosphor particle suspension.

The phosphor particles of the present invention are useful in making viewing screens for color television receivers or other types of color display systems. Such a viewing screen is illustrated in FIG. 5 in which blue, or cyan and blue, light-emitting particles, each having a barrier layer to increase the electron energization threshold of the respective phosphors, are randomly mixed with particles of a red light-emitting phosphor to form a thin closely packed layer 17 on a transparent glass face plate 19, which layer is swept by a narrow electron scanning beam 21. Each of the red, cyan and blue light-emitting phosphors has a different energy threshold so that each is differently responsive to electrons of differing energies or velocities and will luminesce only when bombarded with radiation of sufficient energy to penetrate the barrier layer, where one is present, and reach the active region of the phosphor. The surface barrier layers formed on phosphor particles treated in accordance with the present invention provide the different beam energy thresholds so that such viewing screens may be made for color display systems.

It will be understood that phosphor particles with compositions other than those defined in the above examples may be utilized. For example, activated zinc tungstate, zinc silicate, zinc phosphate, calcium phosphate and europium-activated yttrium ortho-vanadate phosphors may be subjected to treatment in accordance with the present invention and have barrier layers formed thereon. Also, it will be understood that the particle size of the phosphor particles treated by the methods of the invention may vary widely.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of increasing the electron energization threshold of phosphor particles consisting of the steps of:
    (a) heating a molten salt to an elevated temperature, said salt being selected from the group consisting of zinc chloride, zinc fluoride, zinc bromide, and zinc acetate, and said elevated temperature being in the range of 400–500° C.;
    (b) mixing impurities with said molten salt in the amount of 1 p.p.m. to 1,000 p.p.m., said impurities being selected from the group consisting of magnesium, manganese, copper and silver;
    (c) suspending said phosphor particles in the mixture of molten salt and impurities, while maintaining said elevated temperature for a sufficient period of time for a surface layer to form on said particles;
    (d) cooling the resulting intermixture, and
    (e) dissolving the salt in said intermixture with a solvent in which the phosphor particles are substantially insoluble, said solvent being selected from the group consisting of methanol, water, and acetone;
    whereby a surface layer is formed on said phosphor particles, which layer acts as an electron retarding barrier.

2. The method according to claim 1 including the step of flowing an inert gas through the intermixture of molten salt, impurities and suspended phosphor particles during the period that said intermixture is maintained at said elevated temperature.

3. The method according to claim 2 wherein said phosphor particles comprise a zinc sulfide-containing phosphor.

References Cited

UNITED STATES PATENTS 3,449,148  6/1969  Shortes _____ 117—100 XR

ALFRED L. LEAVITT, Primary Examiner
W. F. CYRON, Assistant Examiner

U.S. Cl. X.R.

117—100